US012101155B2

(12) United States Patent
Pezeshki et al.

(10) Patent No.: US 12,101,155 B2
(45) Date of Patent: Sep. 24, 2024

(54) USER EQUIPMENT INDICATION TO SUSPEND REPORT OCCASIONS

(71) Applicant: QUALCOMM Incorporated, San Diego, CA (US)

(72) Inventors: Hamed Pezeshki, San Diego, CA (US); Tao Luo, San Diego, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 17/160,217

(22) Filed: Jan. 27, 2021

(65) Prior Publication Data

US 2022/0239359 A1 Jul. 28, 2022

(51) Int. Cl.
*H04B 7/06* (2006.01)
*H04B 17/318* (2015.01)
*H04W 24/10* (2009.01)

(52) U.S. Cl.
CPC ......... *H04B 7/0658* (2013.01); *H04B 7/0626* (2013.01); *H04B 7/0632* (2013.01); *H04B 7/0639* (2013.01); *H04B 17/318* (2015.01); *H04W 24/10* (2013.01)

(58) Field of Classification Search
CPC .. H04B 7/0658; H04B 17/318; H04B 7/0626; H04B 7/0632; H04B 7/0639; H04W 24/10
See application file for complete search history.

(56) References Cited

U.S. PATENT DOCUMENTS

| 10,879,985 | B2 * | 12/2020 | Zhou | H04L 5/0057 |
| 11,128,359 | B2 * | 9/2021 | Zhou | H04W 80/02 |
| 11,382,042 | B2 * | 7/2022 | Raghunathan | H04W 52/0261 |
| 11,419,066 | B2 * | 8/2022 | Jeon | H04W 72/0466 |
| 2010/0323627 | A1 * | 12/2010 | Alanara | H04B 17/24 455/67.11 |
| 2016/0373994 | A1 * | 12/2016 | Yiu | H04W 52/0206 |

(Continued)

FOREIGN PATENT DOCUMENTS

| CA | 3029574 A1 * | 7/2019 | H04W 24/10 |
| WO | 2020213964 A1 | 10/2020 | |
| WO | WO-2021254591 A1 * | 12/2021 | |

OTHER PUBLICATIONS

International Search Report and Written Opinion—PCT/US2021/073123—ISA/EPO—Mar. 15, 2022.

*Primary Examiner* — Kashif Siddiqui
(74) *Attorney, Agent, or Firm* — ArentFox Schiff LLP

(57) ABSTRACT

A user equipment may be configured to perform UE indication to temporarily suspend report occasions. In some aspects, the user equipment may receive report configuration information from a base station, the report configuration information identifying a report parameter to provide in a channel state information (CSI) report, and determine a predicted value of the report parameter based on a plurality of historic measurements. Further, the user equipment may determine to suspend transmission of the report parameter based on the predicted value, and transmit a report suspension message to the base station, the report suspension message indicating that the UE has implemented a temporary suspension of reporting of the report parameter in the CSI report.

26 Claims, 6 Drawing Sheets

(56) References Cited

U.S. PATENT DOCUMENTS

| | | | |
|---|---|---|---|
| 2017/0367111 A1* | 12/2017 | Gelabert | |
| 2018/0263021 A1* | 9/2018 | He | H04L 5/0057 |
| 2018/0295637 A1* | 10/2018 | Manolakos | H04W 72/54 |
| 2019/0149213 A1* | 5/2019 | Zhou | H04L 5/001 |
| | | | 370/329 |
| 2020/0099435 A1* | 3/2020 | Kang | H04W 72/0446 |
| 2020/0186227 A1 | 6/2020 | Reider et al. | |
| 2020/0221423 A1* | 7/2020 | Wang | H04W 72/02 |
| 2021/0351885 A1* | 11/2021 | Chavva | |
| 2022/0131583 A1* | 4/2022 | Lee | H04B 7/0695 |
| 2022/0201566 A1* | 6/2022 | Shrivastava | H04L 1/0038 |

\* cited by examiner

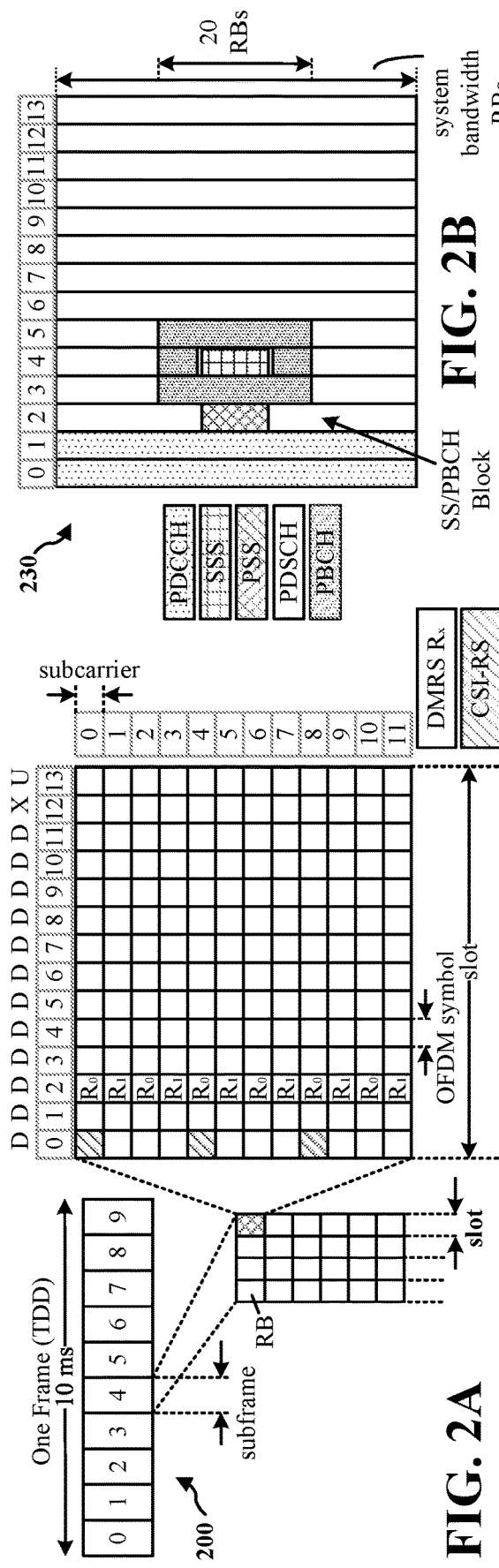
FIG. 2A
FIG. 2B
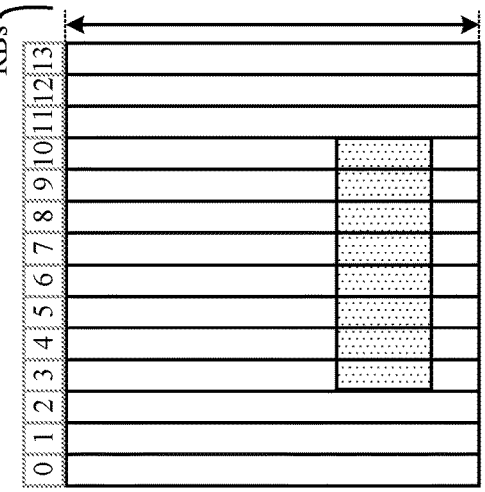
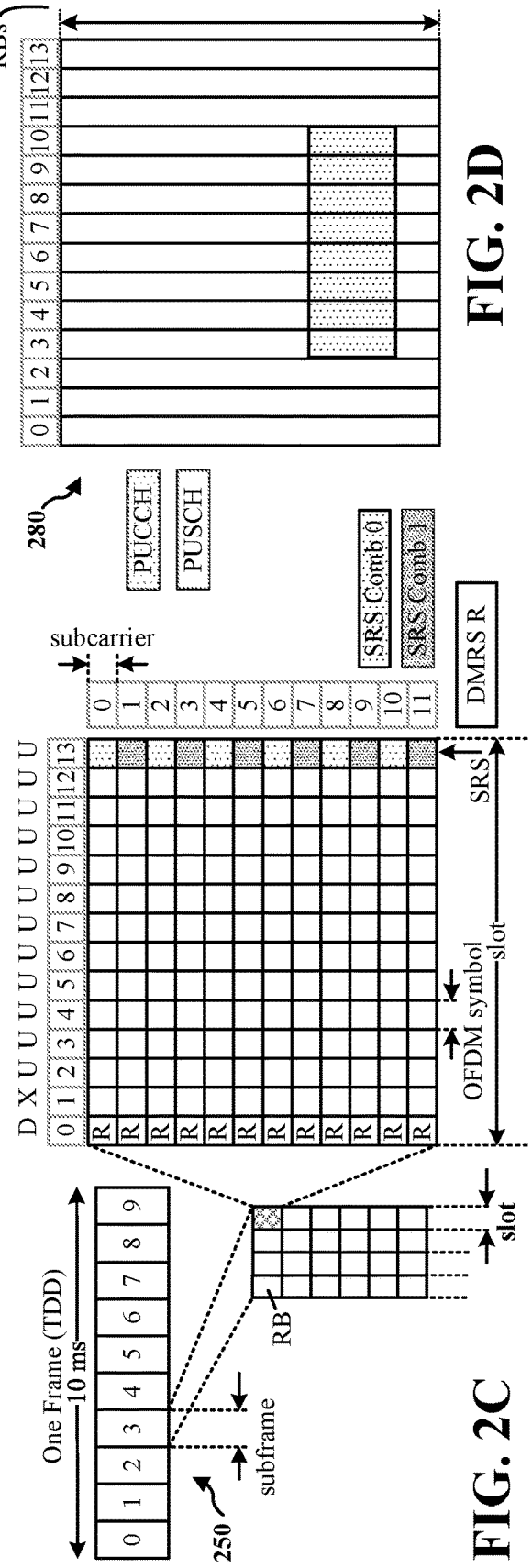
FIG. 2C
FIG. 2D

USER EQUIPMENT INDICATION TO SUSPEND REPORT OCCASIONS

BACKGROUND

Technical Field

The present disclosure relates generally to wireless communication, and more particularly, using a user equipment (UE) indication to provide efficient channel reporting management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising receiving report configuration information from a base station, the report configuration information identifying a report parameter to provide in a channel state information (CSI) report; determining a predicted value of the report parameter based on a plurality of historic measurements; determining to suspend transmission of the report parameter based on the predicted value; and transmitting a report suspension message to the base station, the report suspension message indicating that the UE has implemented a temporary suspension of reporting of the report parameter in the CSI report.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
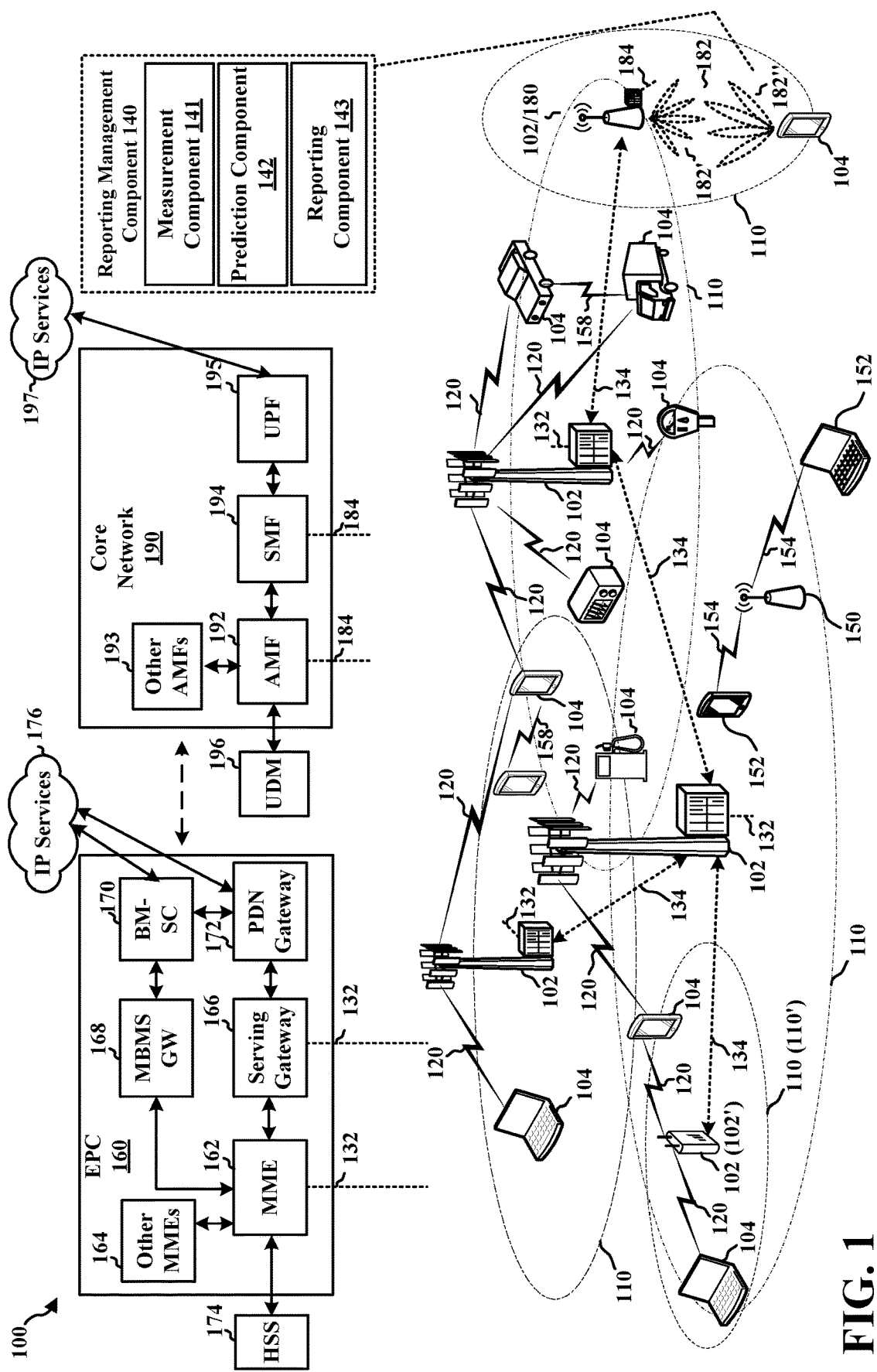
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for using a UE indication to suspend (i.e., skip) periodic or semi-persistent reporting. In some aspects, a UE may be configured to periodically or semi-persistently transmit channel measurement information over an uplink channel to a base station. Further, the base station may determine a channel quality from the channel measurement information, and employ the channel measurement information to determine precoding of antenna ports and/or set link adaptation. As described herein, the UE may predict future channel measurements based on historic channel measurements, and determine whether to suspend reporting the channel measurement information for a period of time based on the predicted channel measurements. Accordingly, in some aspects, a UE may be configured to minimize or reduce uplink overhead, uplink interference to other UEs, and/or power consumption by suspending reporting of the channel measurement information.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a UE 104 may include a reporting management component 140 configured to manage reporting of channel measurement information (e.g., a CSI report). The reporting management component 140 may include a measurement component 141 configured to determine channel measurement information, a prediction component 142 configured to generate channel measurement predictions based on historic channel measurement information, and a reporting component 143 configured to report channel measurement information and the status of reporting activity by the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as Rx for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
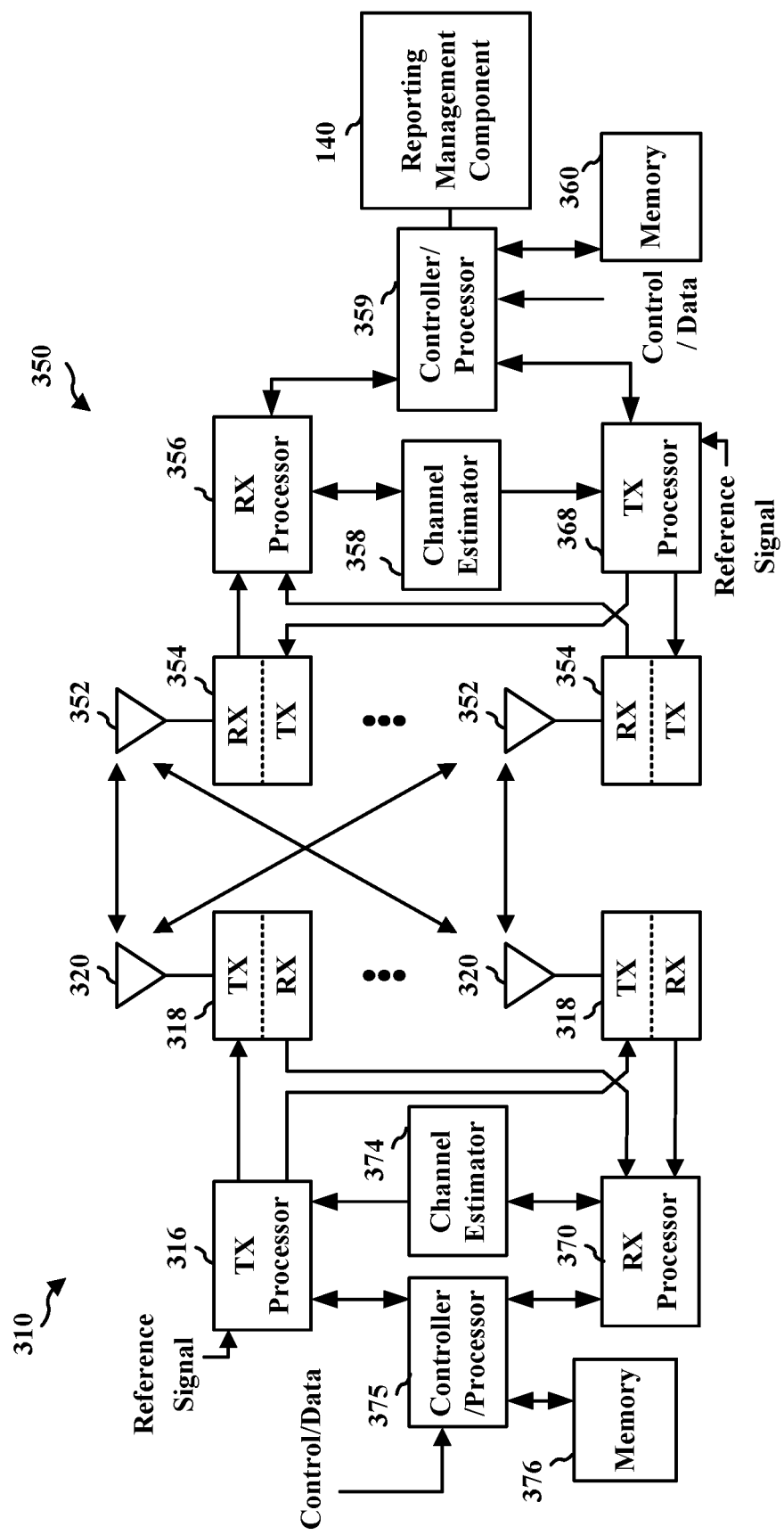
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the reporting management component 140 of FIG. 1.

A UE may be configured to report channel information to a network. For example, a communication network may configure a UE to measure one or more attributes of a channel between the UE and a base station, and report information including the attributes of the channel to the base station. Further, the base station may utilize the channel information to efficiently operate one or more channels between the UE and the base station for transmission of network communications. However, frequent reporting may waste battery capacity, thereby having an adverse effect on the operation of the UE. In addition, transmission of reporting messages via an UL channel may interfere with communications between other UEs and the network, and/or require a burdensome processing overhead. The present disclosure provides techniques for using a UE indication to suspend reporting occasions. As described in detail herein, a UE may be configured to suspend channel-related reporting based on a channel information prediction. In particular, in some aspects, the UE may be able to predict channel measurements reflecting an attribute of a channel using historical channel information and suspend reporting when the predicted values are not significantly different from recent channel measurements. Accordingly, the present techniques enable a UE to suspend periodic or semi-persistent reporting of channel information, thereby minimizing or reducing uplink overhead, uplink interference to other UEs, and/or power consumption.

Figure 4:
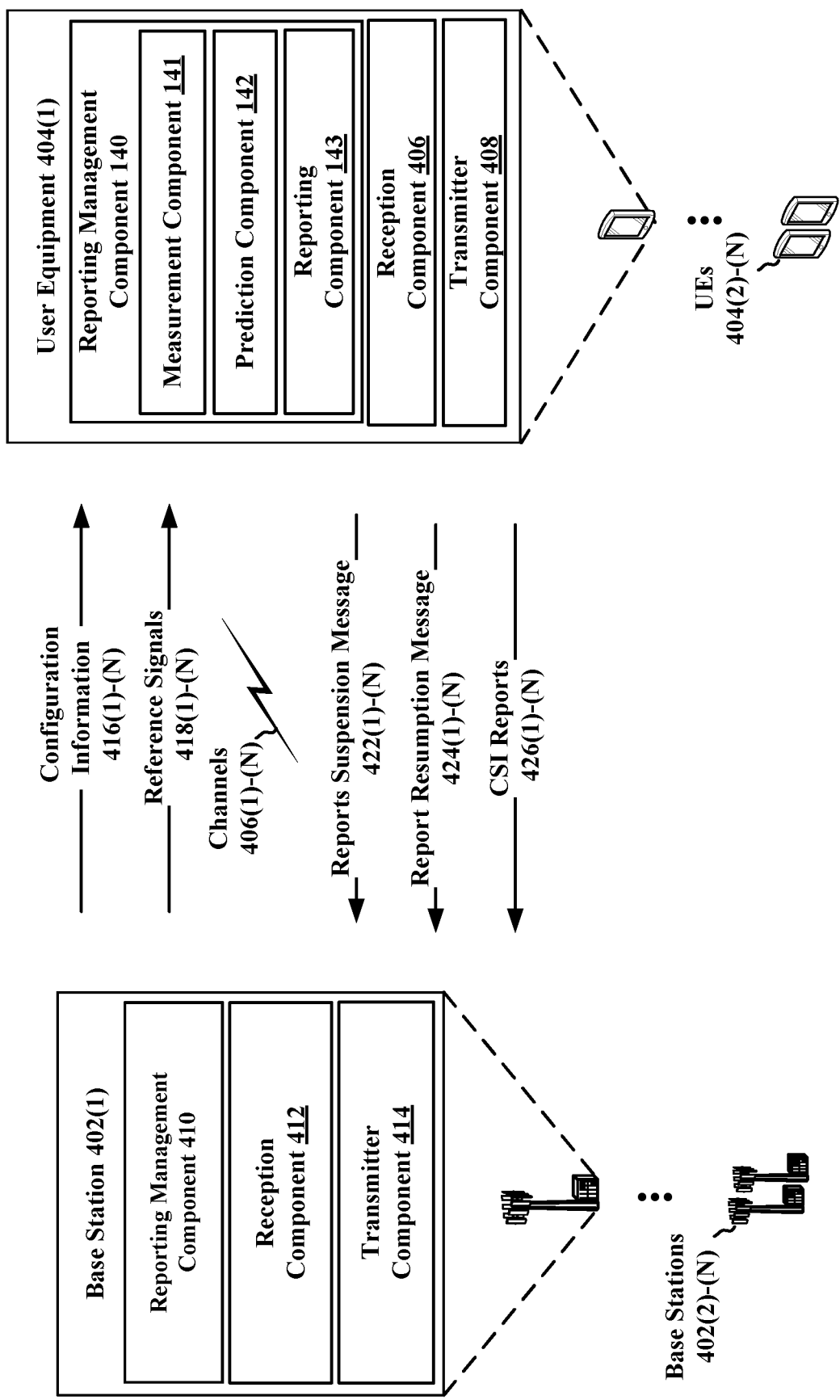
FIG. 4 is a diagram illustrating example communications and components of a base station and UEs, in accordance with some aspects of the present disclosure.
Figure 5:
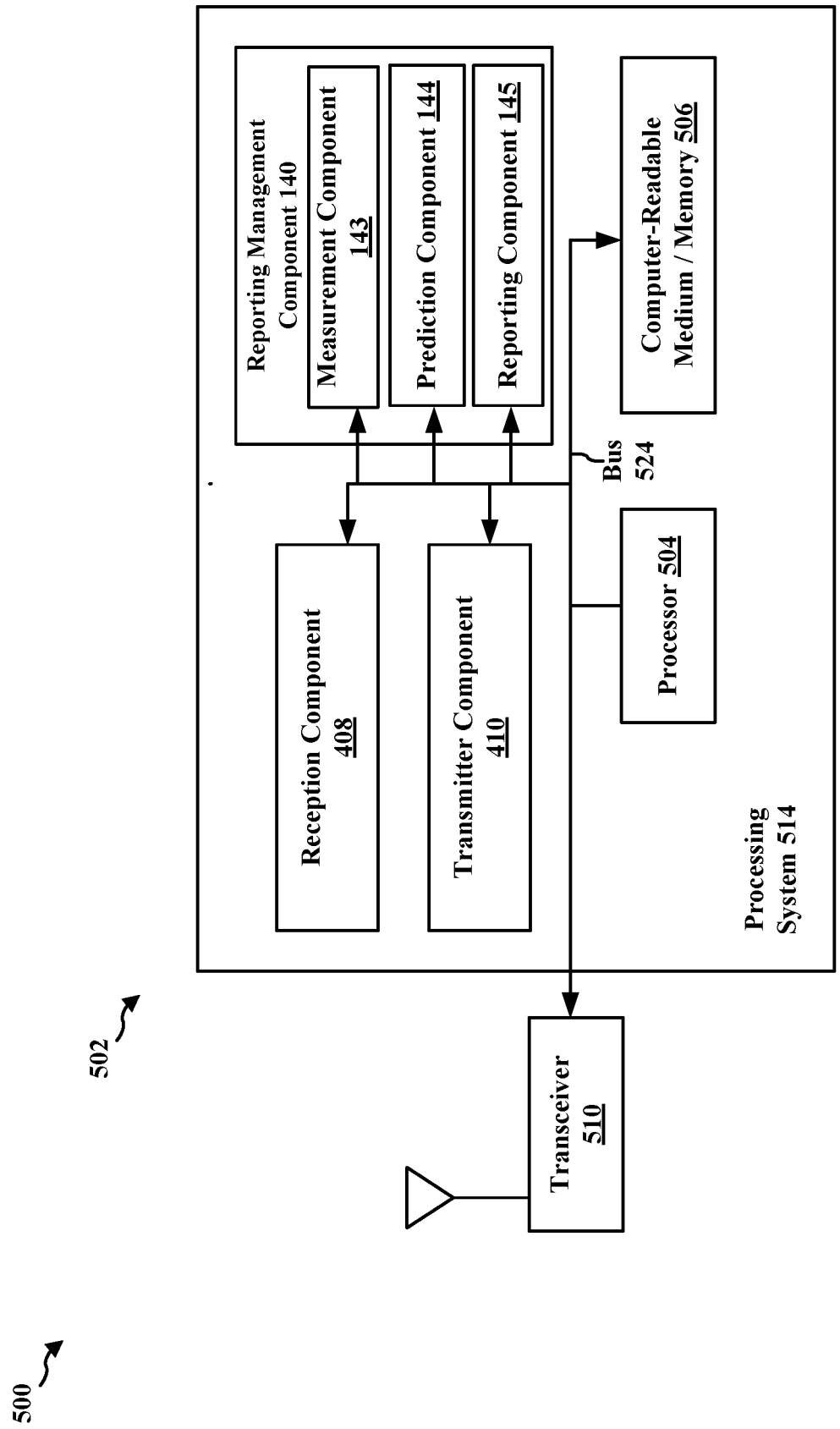
FIG. 5 is a diagram illustrating an example of a hardware implementation for a UE employing a processing system, in accordance with some aspects of the present disclosure.
Figure 6:
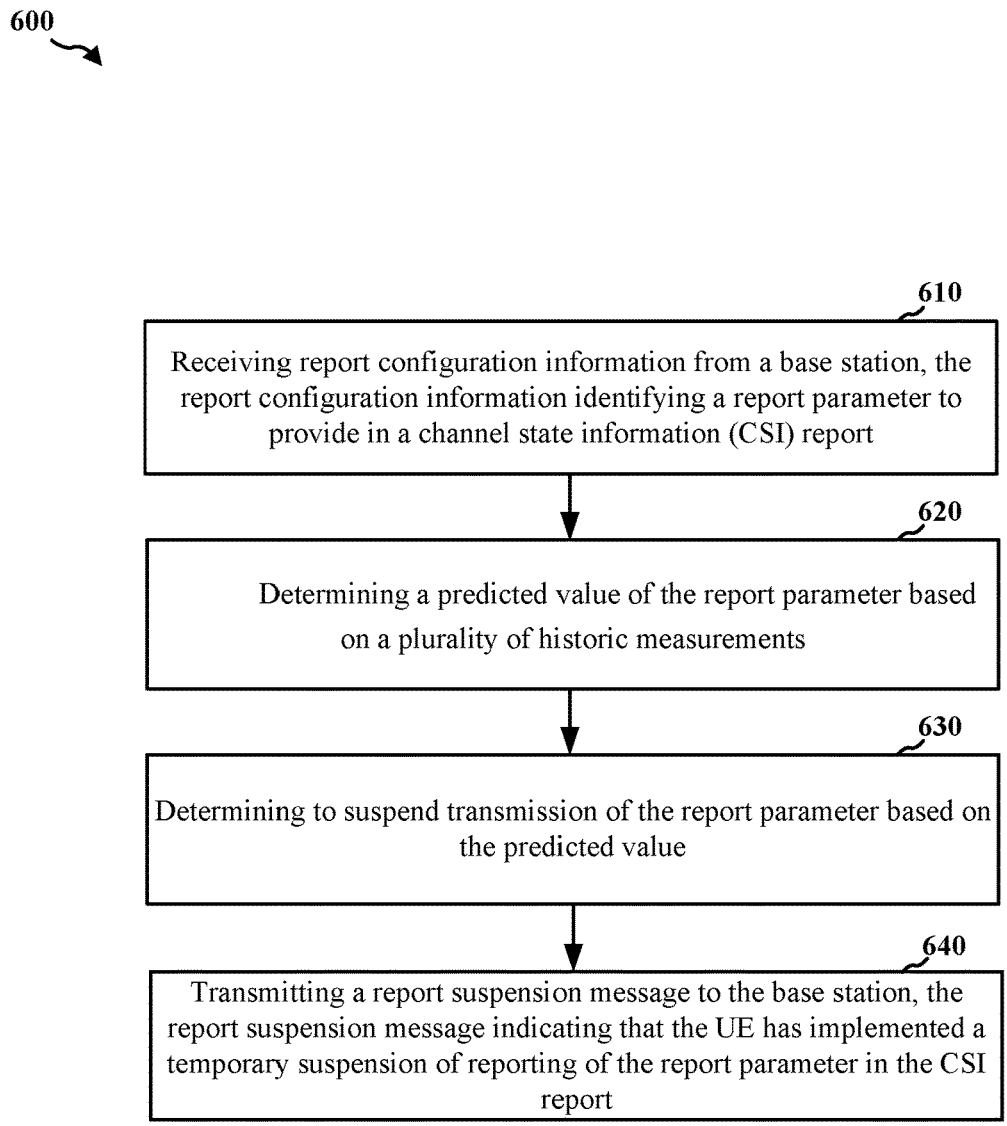
FIG. 6 is a flowchart of an example method of using a UE indication to suspend report occasions, in accordance with some aspects of the present disclosure.

Referring to FIGS. 4-6, in one non-limiting aspect, a system 400 is configured to minimize or reduce uplink overhead, uplink interference to other UEs, and/or power consumption by suspending reporting of the channel measurement information via UE indications.

FIG. 4 is a diagram illustrating example communications and components of base stations and UEs. As illustrated in FIG. 4, the system 400 may include one or more base stations 402(1)-(N) and one or more UEs 404(1)-(N). In some aspects, the plurality of UEs 404(1)-(N) may be located within a similar location, and operating on the same network as the base stations 402. Additionally, in some aspects, the one or more base stations 402(1)-(N) may be examples of a base station 102, and the plurality of UEs 404(1)-(N) may be examples of a UE 104.

As illustrated in FIG. 4, a UE 404(1) may include the reporting management component 140 configured to manage reporting by the UE 404(1). As described with respect to FIG. 1, the reporting management component 140 may include the measurement component 141, the prediction component 142, and the reporting component 143. In addition, the UE 404 may include a reception component 406 and a transmitter component 408. The transmitter component 408 may be configured to generate signals for transmission operations and sensing as described herein. The transmitter component 408 may include, for example, a RF transmitter for transmitting the signals described herein. The reception component 406 may include, for example, a RF receiver for receiving the signals described herein. In an aspect, the reception component 406 and the transmitter component 408 may be co-located in a transceiver (e.g., the transceiver 510 shown in FIG. 5).

Further, the base station 402(1) may include the reporting management component 410 configured to manage channel information reporting by one or more of the UEs 404(1)-(N). In addition, the base station 404(1) may include a reception component 412 and a transmitter component 414. The reception component 412 may include, for example, a radio frequency (RF) receiver for receiving the signals described herein. The transmitter component 414 may include, for example, an RF transmitter for transmitting the signals described herein. In an aspect, the reception component 412 and the transmitter component 414 may be co-located in a transceiver.

As illustrated in FIG. 4, the reporting management component 410 may transmit configuration information 416 to the UE 404(1). Some examples of the configuration information 416 may include a CSI-ReportConfig message. Further, the configuration information 416 may configure measurement activity and measurement reporting at the UE 404(1). For example, the configuration information 416 may include or indicate a report parameter (e.g., CQI, PMI, RI, etc.) identifying the measurement for the UE 404(1) to measure, and a resource to be measured. Additionally, the configuration information 416 may indicate the periodicity of reporting by the UE 404(1). For example, the configuration information 416 may indicate whether the UE 404(1) should perform periodic, semi-persistent, or aperiodic reporting, and temporal parameters defining the periodicity of reporting. As used herein, in some aspects, periodic reporting may refer to transmitting the configuration information 416 with a configured periodicity. As used herein, in some aspects, semi-persistent reporting may refer to transmitting the configuration information 416 with a configured periodicity that may be activated and deactivated by a message (e.g., a MAC-CE). In some aspects, periodic reporting may be performed over a periodically-assigned PUCCH, and semi-persistent reporting may be performed over a periodically-assigned PUCCH or a semi-persistently allocated PUSCH. Further, the UE 404(1) may employ the PUSCH for cases with reporting payloads above a predefined threshold.

Upon receipt of the configuration information 416, the reporting management component 140 may configure the measurement component 141 using the configuration information 416. In response, the measurement component 141 may measure the quality of a channel 420(1) between the base station 402(1) and the UE 404(1) by sounding the reference signals 418(1)-(N) (e.g., CSI-RS) received from the base station 402, in accordance with the configuration 416. Further, the measurement component 141 may store the measurements of the channel 420(1) as historic channel information. For example, the measure component 141 may maintain data storage (e.g., a database) with measurements for each channel associated with the UE 404(1).

Additionally, the prediction component 142 may predict measurements based on the historic channel information. For instance, the prediction component 142 may predict values for a report parameter identified in the configuration information 416 for future CSI reports based on historic values of the report parameters, as defined in the channel history information. In some other instances, the prediction component 142 may predict beam RSRP measurements based on historic values of beam RSRP measurements, as defined in the channel history information. Additionally, the prediction component 142 may predict values for a report parameter or RSRP measurements based on a mobility state of the UE 404(1). For example, the prediction component 142 may predict consistent measurement channel measurements based at least in part on the UE 404(1) having a static mobility state for a period of time.

In some aspects, the prediction component 142 may employ a machine learning techniques (e.g., an artificial neural network) to generate the predicted measurements. An artificial neural network, such as an artificial neural network with an interconnected group of artificial neurons (e.g., neuron models), may be a computational device or may be a method to be performed by a computational device.

Further, recurrent neural networks (RNNs) refer to a class of neural network, which includes a cyclical connection between nodes or units of the network. The cyclical connection creates an internal state that may serve as a memory that enables recurrent neural networks to model dynamical systems. That is, cyclical connections offer recurrent neural networks the ability to encode memory. In some aspects, a recurrent architecture may be helpful in recognizing patterns that span more than one of the input data chunks that are delivered to the neural network in a sequence. Thus, if successfully trained, recurrent neural networks may be specified for sequence learning applications.

In some aspects, the prediction component 142 may employ a recurrent neural network (RNN) to generate the predicted measurements. Further, the machine learning model may be trained offline and/or online at the UE 404(1). In some other examples, the prediction component 142 may employ auto regression and/or any other prediction techniques to generate the predicted measurements.

In some aspects, the prediction component 142 may identify a first amount of historic measurement instances, and generate a second amount of predicted measurement instances based on the first amount of historic measurements. Further, the reporting management component 140 may determine whether to report channel information based on the predicted measurements. For example, if the reporting management component 140 predicts that there will be no change or a change below a predefined threshold for a reporting parameter over one or more report occasions, the reporting management component 140 may determine that the UE 404(1) may suspend reporting to the base station 402 during the one or more report occasions.

In response, the reporting component 143 may transmit a report suspension message 422 to the base station 402(1). Further, the report suspension message 422 may indicate that the UE 404(1) will not be reporting channel measurement information for the one or more report occasions. As such, the UE 404(1) may conserve battery power, minimize or reduce resources allocated to UL overhead, and/or minimize or reduce UL interference to the other UEs 404(2)-(N).

Additionally, during the suspended reporting occasions, the measurement component 141 may continue to measure the reference signals 418. Further, if the measurement component 141 determines that the measured values differ from the predicted values, the reporting component 143 may transmit a report resumption message 424 to the base station 402. For example, if the difference between a measured beam RSRP measurement at an instance in time and the predicted beam RSRP measurement at the instance in time is greater than a predefined threshold, the reporting component 143 may resume reporting of channel information and transmit the report resumption message 424 to the base station 402(1). In some examples, the reporting management component 140 may order transmission of the report resumption message 424 in response to a predefined number of actual measurements having values that differ from the predicted values by the predefined threshold. In some aspects, the report resumption message 424 may indicate to the base station 402(1) that the UE 404(1) has resumed reporting of channel information. In some instances, the reporting component 143 may transmit the report resumption message 424 via the PUCCH. Upon resumption of reporting, the reporting component 143 may transmit reporting messages (e.g., CSI reports 426(1)-(N)) to the base station 402.

FIG. 5 is a diagram 500 illustrating an example of a hardware implementation for a UE 502 (e.g., the UE 102, the UE 404, etc.) employing a processing system 514. The processing system 514 may be implemented with a bus architecture, represented generally by the bus 524. The bus 524 may include any number of interconnecting buses and/or bridges depending on the specific application of the processing system 514 and the overall design constraints. The bus 524 links together various circuits including one or more processors and/or hardware components, represented by the processor 504, the reporting management component 140, and the computer-readable medium (e.g., non-transitory computer-readable medium)/memory 506. The bus 524 may also link various other circuits such as timing sources, peripherals, voltage regulators, and power management circuits, which are well known in the art, and therefore, will not be described any further.

The processing system 514 may be coupled with a transceiver 510. The transceiver 510 may be coupled with one or more antennas. The transceiver 510 provides a means for communicating with various other apparatus over a transmission medium. The transceiver 510 receives a signal from the one or more antennas, extracts information from the received signal, and provides the extracted information to the processing system 514, specifically the reception component 408. In addition, the transceiver 510 receives information from the processing system 514, specifically the transmitter component 410, and based on the received information, generates a signal to be applied to the one or more antennas. The processing system 514 includes a processor 504 coupled with a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 may further includes the reporting management component 140. The component may be a software component running in the processor 504, resident/stored in the computer readable medium/memory 506, one or more hardware components coupled with the processor 504, or some combination thereof. The processing system 514 may be a component of the UE 350 and may include the memory 360 and/or at least one of the TX processor 368, the RX processor 356, and the controller/processor 359. Alternatively, the processing system 514 may be the entire UE (e.g., see 350 of FIG. 3).

The reporting management component 140 may be configured to manage suspension and resumption of reporting of channel information based on predicted values determined by the prediction component 142. As described in detail herein, the suspension of reporting of channel information by the reporting component 143 may conserve battery power, minimize or reduce resources allocated to UL overhead, and/or minimize or reduce UL interference to neighboring UEs.

The aforementioned means may be one or more of the aforementioned components of the UE 502 and/or the processing system 514 of UE 502 configured to perform the functions recited by the aforementioned means. As described supra, the processing system 514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 6 is a flowchart of a method 600 of UE indication of suspending report occasions, in accordance with some aspects of the present disclosure. The method may be performed by a UE (e.g., the UE 104 of FIGS. 1 and 3, which may include the memory 360 and which may be the entire UE 104 or a component of the UE 104, such as the reporting management component 140, the TX processor 368, the RX processor 356, and/or the controller/processor 359; the UE 404 of FIG. 4; and/or the UE 502 of FIG. 5).

At block 610, the method 600 includes receiving report configuration information from a base station, the report configuration information identifying a report parameter to provide in a CSI report. For example, the UE 404(1) may receive the configuration information 416(1)-(N) from the base station 402(1). Further, in some aspects, the configuration information 416 may include a report parameter identifying a measurement to perform and report to the base station 402(1). Additionally, the configuration parameter 416(1)-(N) may include a periodicity value indicating how often to report the report parameter.

Accordingly, the UE 104, the UE 404, UE 502, the TX processor 368, the RX processor 356, and/or the controller/processor 359, executing the reporting management component 140 may provide means for receiving report configuration information from a base station, the report configuration information identifying a report parameter to provide in a CSI report.

At block 620, the method 600 may include determining a predicted value of the report parameter based on a plurality of historic measurements. For example, the measurement component 141 may measure the reference signals 418(1)-(N) over the channel 406(1)-(N) to determine historical measurements of the report parameter. Further, the prediction component 142 may determine a plurality of predicted values corresponding to the state and/or quality of the channel 406(1) (e.g., the reporting parameter) at a plurality of time instances (e.g., future reporting occasions) based on the historical measurements.

Accordingly, the UE 104, the UE 404, UE 502, the TX processor 368, the RX processor 356, and/or the controller/processor 359 executing the prediction component 142 may provide means for determining a predicted value of the report parameter based on a plurality of historic measurements.

At block 630, the method 600 may include determining to suspend transmission of the report parameter based on the predicted value. For example, the UE 404(1) may suspend reporting of the reporting parameter to the base station 404(1) based at least in part on the difference between a recent measurement (e.g., the measurement at the last reporting occasion) of the reporting parameter and a predicted value of the reporting parameter at the next reporting occasion being greater than a predefined threshold.

Accordingly, the UE 104, the UE 404, UE 502, the TX processor 368, the RX processor 356, and/or the controller/processor 359 executing the reporting management component 140 may provide means for determining to suspend transmission of the report parameter based on the predicted value.

At block 640, the method 600 may include transmitting a report suspension message to the base station, the report suspension message indicating that the UE has implemented a temporary suspension of reporting of the report parameter in the CSI report. For example, the UE 404(1) may transmit the reporting suspension message 422(1) to the base station 402(1) indicating that the UE 404(1) has temporarily suspended reporting of the reporting parameter. In some examples, the reporting suspension message 422(1) may identify how many reporting occasions will be suspended by the UE 404(1). In some instances, the UE 404(1) may continue to transmit reporting messages (e.g., a CSI report) to the base station 402(1) without transmitting reporting messages including the report parameter.

Accordingly, the UE 104, the UE 404, UE 502, the TX processor 368, the RX processor 356, and/or the controller/processor 359 executing the reporting component 143 may provide means for transmitting a report suspension message to the base station, the report suspension message indicating that the UE has implemented a temporary suspension of reporting of the report parameter in the CSI report.

Further, during the suspended reporting occasions, the UE 404 may determine measurement values associated with the report parameter, determine actual values of the report parameter based on the measurement values, and determine that the difference between the predicted value of a particular reporting occasion and the actual value at the particular reporting occasion is greater than a threshold value. In response, the UE 404 may transmit a report resumption message 424 to the base station 402, and resume reporting of channel information to the base station 402. For example, the measurement component 141 may continue to measure the reference signals 418 during the suspended reporting occasion. Further, if the measurement component 141 determines that a measured value differs from the corresponding predicted value, the reporting management component 140 may resume provisioning of the report parameter in the CSI report. Further, the reporting component 143 may transmit a report resumption message 424 to the base station 402.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a user equipment (UE), comprising: receiving report configuration information from a base station, the report configuration information identifying a report parameter to provide in a channel state information (CSI) report; determining a predicted value of the report parameter based on a plurality of historic measurements; determining to suspend transmission of the report parameter based on the predicted value; and transmitting a report suspension message to the base station, the report suspension message indicating that the UE has implemented a temporary suspension of reporting of the report parameter in the CSI report.

B. The method as paragraph A recites, further comprising: determining a measurement value associated with the report parameter; determining an actual value of the report parameter based on the measurement value; determining that a difference between the predicted value and the actual value is greater than a threshold value; and resuming provision of the report parameter in the CSI report based on the difference being greater than the threshold value.

C. The method as paragraph B recites, further comprising: transmitting a report resumption message to the base station based on the actual value being greater than the threshold value, the report resumption message indicating that the UE has ended the temporary suspension of the reporting of the report parameter.

D. The method as any of paragraphs A-C recite, wherein determining the predicted value of the report parameter comprises determining the predicted value of the report parameter based at least in part on the plurality of historic measurements and a machine learning model.

E. The method as any of paragraphs A-D recite, wherein determining the predicted value of the report parameter comprises determining the predicted value of the report parameter based at least in part on the plurality of historic measurements and a recurrent neural network.

F. The method as any of paragraphs A-E recite, wherein determining the predicted value of the report parameter comprises determining the predicted value of the report parameter based on a mobility state of the UE.

G. The method as any of paragraphs A-F recite, wherein determining the predicted value of the report parameter comprises determining the predicted value of the report parameter based on the plurality of historic measurements and a prediction algorithm.

H. The method as any of paragraphs A-G recite, further comprising measuring a channel to determine the plurality of historic measurements; and determining an actual value of the report parameter based on the plurality of historic measurements.

I. The method as any of paragraphs A-H recite, wherein determining the predicted value of the report parameter based on the plurality of historic measurements comprises determining a plurality of predicted values, and determining to suspend the transmission of the report parameter comprises determining a number of reports to skip during the temporary suspension based on the plurality of predicted values.

J. The method as any of paragraphs A-I recite, wherein the report parameter represents channel quality information (CQI).

K. The method as any of paragraphs A-J recite, wherein the report parameter represents a precoding matrix indicator (PMI).

L. The method as any of paragraphs A-K recite, wherein the report parameter represents a channel state information reference signal (CSI-RS).

M. The method as any of paragraphs A-L recite, wherein the report parameter represents a reference signal received power (RSRP).

N. The method as any of paragraphs A-M recite, wherein the UE is a 5G NR wireless equipment device.

O. The method as any of paragraphs A-N recite, wherein the report configuration information requests periodic reporting of the CSI report P. The method as any of paragraphs A-N recite, wherein the report configuration information requests semi-persistent reporting of the CSI report.

Q. A user equipment for wireless communication, comprising a memory storing computer-executable instructions; and at least one processor coupled with the memory and configured to execute the computer-executable instructions to perform the method of any of claims A-P.

R. A user equipment for wireless communication, comprising means for performing the method of any of claims A-P.

S. A non-transitory computer-readable medium storing computer executable code, the code when executed by a processor causes the processor to perform the method of any of claims A-P.

What is claimed is:

1. A method of wireless communication at a user equipment (UE), comprising:
   receiving report configuration information from a base station, the report configuration information identifying a report parameter to provide in a channel state information (CSI) report and a periodicity for transmitting the CSI report;
   determining, for one or more future reporting occasions that are based on the periodicity, a predicted value of the report parameter based on a plurality of historic measurements; and
   transmitting, based on the predicted value, a report suspension message to the base station, the report suspension message indicating that the UE is not reporting the report parameter in the CSI report in the one or more future reporting occasions.

2. The method of claim 1, further comprising:
   determining a measurement value associated with the report parameter;
   determining an actual value of the report parameter based on the measurement value;
   determining that a difference between the predicted value and the actual value is greater than a threshold value; and
   resuming provision of the report parameter in the CSI report based on the difference being greater than the threshold value.

3. The method of claim 2, further comprising transmitting, subsequently to the report suspension message, a report resumption message to the base station based on the actual value being greater than the threshold value, the report resumption message indicating that the UE is reporting the report parameter in at least a portion of the one or more future reporting occasions.

4. The method of claim 1, wherein determining the predicted value of the report parameter comprises determining the predicted value of the report parameter based at least in part on providing the plurality of historic measurements as input to a machine learning model.

5. The method of claim 1, wherein determining the predicted value of the report parameter comprises determining the predicted value of the report parameter based at least in part on providing the plurality of historic measurements as input to a recurrent neural network.

6. The method of claim 1, wherein determining the predicted value of the report parameter comprises determining the predicted value of the report parameter based on a mobility state of the UE.

7. The method of claim 1, wherein determining the predicted value of the report parameter comprises determining the predicted value of the report parameter based on the plurality of historic measurements and a prediction algorithm.

8. The method of claim 1, further comprising measuring a channel to determine the plurality of historic measurements.

9. The method of claim 1, wherein determining the predicted value of the report parameter based on the plurality of historic measurements comprises determining a plurality of predicted values, and wherein the report suspension message indicates a number of reports to skip based on the plurality of predicted values.

10. The method of claim 1, wherein the report parameter represents channel quality information (CQI).

11. The method of claim 1, wherein the report parameter represents a precoding matrix indicator (PMI).

12. The method of claim 1, wherein the report parameter represents a reference signal received power (RSRP).

13. The method of claim 1, wherein the UE is a 5G NR wireless equipment device.

14. The method of claim 1, wherein the report configuration information requests periodic reporting of the CSI report.

15. The method of claim 1, wherein the report configuration information requests semi-persistent reporting of the CSI report.

16. A user equipment (UE) for wireless communication, comprising:
   a memory; and
   at least one processor coupled with the memory and configured to:
      receive report configuration information from a base station, the report configuration information identifying a report parameter to provide in a channel state information (CSI) report and a periodicity for transmitting the CSI report;
      determine, for one or more future reporting occasions that are based on the periodicity, a predicted value of the report parameter based on a plurality of historic measurements; and
      transmit, based on the predicted value, a report suspension message to the base station, the report suspension message indicating that the UE is not reporting the report parameter in the CSI report in the one or more future reporting occasions.

17. The UE of claim 16, wherein the at least one processor is further configured to:
   determine a measurement value associated with the report parameter;
   determine an actual value of the report parameter based on the measurement value;
   determine that a difference between the predicted value and the actual value is greater than a threshold value; and
   resume provision of the report parameter in the CSI report based on the difference being greater than the threshold value.

18. The UE of claim 17, wherein the at least one processor is further configured to transmit, subsequently to the report suspension message, a report resumption message to the base station based on the actual value being greater than the threshold value, the report resumption message indicating that the UE is reporting the report parameter in at least a portion of the one or more future reporting occasions.

19. The UE of claim 16, wherein the at least one processor is further configured to measuring a channel to determine the plurality of historic measurements.

20. The UE of claim 16, wherein to determine the predicted value of the report parameter, the at least one processor is further configured to determine the predicted value of the report parameter based at least in part on providing the plurality of historic measurements as input to a recurrent neural network.

21. A non-transitory computer-readable medium storing computer executable code, the code when executed by a processor causes the processor to:

receive report configuration information from a base station, the report configuration information identifying a report parameter to provide in a channel state information (CSI) report and a periodicity for transmitting the CSI report;

determine, for one or more future reporting occasions that are based on the periodicity, a predicted value of the report parameter based on a plurality of historic measurements; and transmit, based on the predicted value, a report suspension message to the base station, the report suspension message indicating that a user equipment (UE) is not reporting the report parameter in the CSI report in the one or more future reporting occasions.

22. The non-transitory computer-readable medium of claim 21, wherein the code when executed by the processor further causes the processor to:

determine a measurement value associated with the report parameter;

determine an actual value of the report parameter based on the measurement value;

determine that a difference between the predicted value and the actual value is greater than a threshold value; and resume provision of the report parameter in the CSI report based on the difference being greater than the threshold value.

23. The non-transitory computer-readable medium of claim 22, wherein the code when executed by the processor further causes the processor to transmit, subsequently to the report suspension message, a report resumption message to the base station based on the actual value being greater than the threshold value, the report resumption message indicating that the UE is reporting the report parameter in at least a portion of the one or more future reporting occasions.

24. The non-transitory computer-readable medium of claim 21, wherein the code when executed by the processor further causes the processor to measure a channel to determine the plurality of historic measurements.

25. The non-transitory computer-readable medium of claim 21, wherein to determine the predicted value of the report parameter, the code when executed by the processor causes the processor to determine the predicted value of the report parameter based at least in part on providing the plurality of historic measurements as input to a machine learning model.

26. The non-transitory computer-readable medium of claim 21, wherein to determine the predicted value of the report parameter, the code when executed by the processor causes the processor to determine the predicted value of the report parameter based at least in part on providing the plurality of historic measurements as input to a recurrent neural network.

* * * * *